Figure 1:
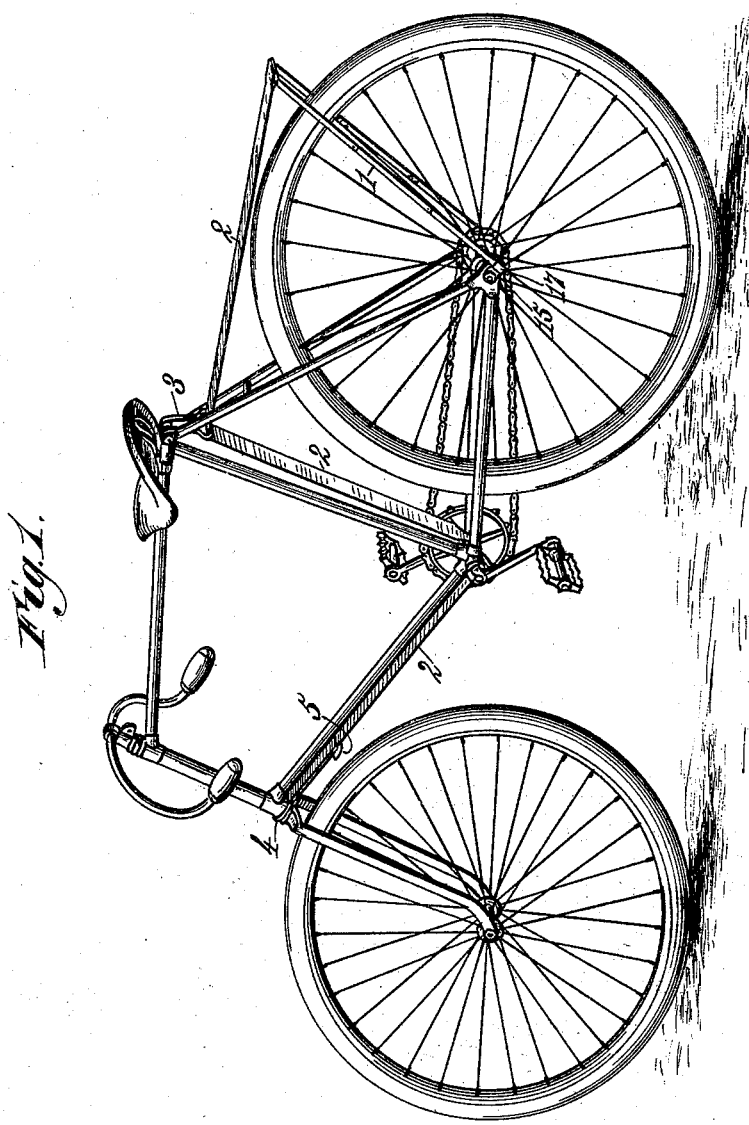

(No Model.) 2 Sheets—Sheet 1.
J. W. SHONE.
MUD GUARD FOR BICYCLES.

No. 544,935. Patented Aug. 20, 1895.

Witnesses.
Robert Everett,
G. W. Rea.

Inventor.
James W. Shone.
By James L. Norris.
Atty.

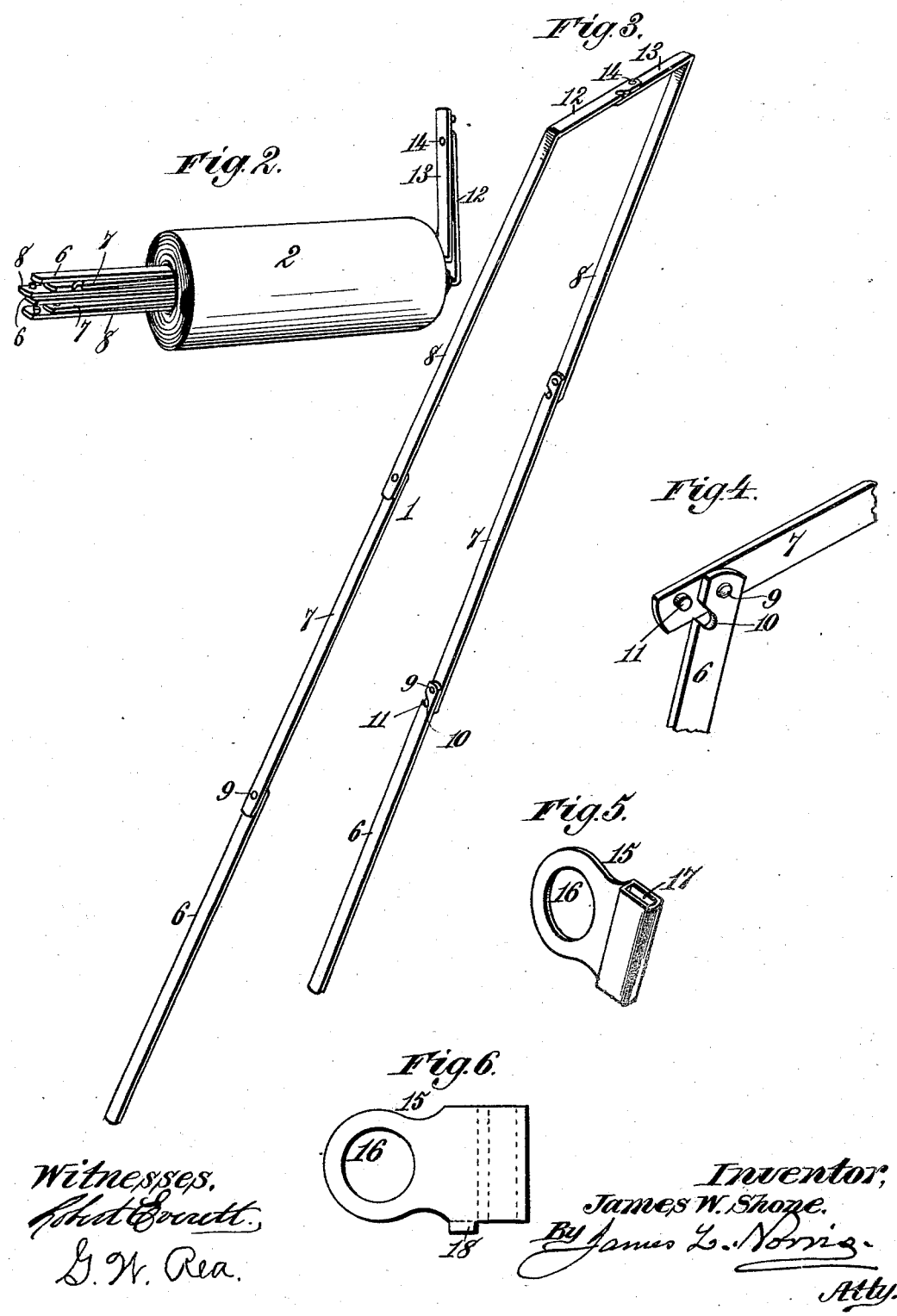

UNITED STATES PATENT OFFICE.

JAMES W. SHONE, OF ROCHESTER, NEW YORK, ASSIGNOR TO THE HALL-SHONE COMPANY, OF SAME PLACE.

MUD-GUARD FOR BICYCLES.

SPECIFICATION forming part of Letters Patent No. 544,935, dated August 20, 1895.

Application filed November 16, 1894. Serial No. 529,043. (No model.)

*To all whom it may concern:*

Be it known that I, JAMES W. SHONE, a citizen of the United States, residing at Rochester, in the county of Monroe and State of New York, have invented new and useful Improvements in Mud-Guards for Bicycles, of which the following is a specification.

My invention relates generally to mud-guards for bicycles and other wheeled vehicles, and specifically to an improved folding stay adapted to be detachably secured to the rear axle of a bicycle for supporting one end of a flexible web which at its other end is adapted to be attached to the frame of the machine at any suitable point, and has for its object to provide a stay of the nature described that shall be readily detachable from the machine, and when so detached may, together with the flexible web, be folded up within an exceedingly small compass and carried in the pocket or in the tool-bag of the machine, and also to provide novel means whereby the stay may be very quickly attached to and detached from the rear axle of the bicycle.

To these ends my invention consists in a stay for mud-guards, consisting of a U-shaped frame the side members of which are made in sections pivotally secured together and folding in one direction only, and a folding cross-brace connecting said side members together at one end, the construction being such that said stay may be folded both laterally and longitudinally, as hereinafter described and claimed.

The invention also consists in certain other features of construction and combination or arrangement of parts hereinafter described and claimed, reference being made to the accompanying drawings, in which—

Figure 1 is a perspective view of a bicycle, showing my improved mud-guard in place. Fig. 2 is a similar view showing the guard folded. Fig. 3 is a similar view of the stay unfolded. Fig. 4 is a detail view of one of the hinge connections of the stay. Fig. 5 is a detail view of one of the brackets for connecting the stay to the axle, and Fig. 6 is a plan view of the blank from which the stay is formed.

Referring to Fig. 1 of the drawings, the numeral 1 indicates my improved stay in position on the rear axle of the bicycle and embracing or straddling the rear wheel, and 2 the web constituting the shield. The web 2 is composed of any suitable or usual material ordinarily employed for the purpose, and at one end is connected by a loop or other suitable means to the upper end of the stay 1, and thence passes over and above the rim of the wheel, and at its other end is connected to any suitable part of the machine. As illustrated in said Fig. 1, the web 2 passes over a stirrup 3, secured to the saddle-support beneath the saddle, thence downwardly beneath and around the pedal-yoke, and finally forward to the fork of the front wheel, to which it is connected by a hook or clip 4, a clasp 5 of well-known construction being provided for adjusting the length of the web, so that when in place on the machine it will be held taut and exert a tension on the stay 1 to hold the latter rigid.

The stay consists of a U-shaped frame made in sections, consisting of light, flat, metallic bars 6 7 8, the end of one bar, as 6, being pivotally secured by a pivot-pin 9 to the next adjacent bar, as 7, near the end of the latter, the bar 6 being provided with a segment-shaped notch or recess 10, that is adapted to be engaged by a stud 11, rigidly affixed to the end of the bar 7, and which serves to prevent the bars from being unfolded but in one direction. There are two series of said bars 6, 7, and 8, arranged parallel to each other at a suitable distance apart, the bars of both series being pivotally connected together in the manner described, so that they all fold in the same direction upon their pivots. The bars 8, forming the upper end of the stay, are bent at a right angle to form connecting-arms 12 13, which are pivotally secured together, as at 14, in the manner above described, one of the bars, as 12, being slightly longer than the other, for the purpose presently made apparent. In pivotally connecting the bars 6, 7, and 8, the bars 6 are pivoted to the adjacent faces or inner sides of the bars 7, while the latter are in like manner secured to the inner sides of the bars 8, so that the bars 6 may be folded between the bars 7, and the bars 6 and 7 in turn folded between the bars 8, after which the two series of bars may be folded closely together by folding the arms 12 and 13 side by side about their pivotal connection 14, the difference in length of the two arms 12 and 13 permitting the bars to fold compactly one over the other. The stay 1 is secured to the rear axle of the bicycle by means of brackets 15, each consisting of a flat metallic plate having a circular aperture 16, and provided with a socket 17, preferably closed at its bottom and of the proper size to permit of the insertion therein of one of the bars 6 of the stay. The bracket may very conveniently be made from the blank shown in Fig. 6 by punching or otherwise forming the perforation 16 therein and then bending up and over the edge of the blank, as shown, to form the socket 17, the projecting lip 18 of the blank being finally bent up to close the bottom of the socket. The brackets 15 are secured to the axle, one upon each end thereof, by passing the perforated portion 16 over the end of the axle, and are fastened thereon by the usual axle-nut employed for securing the wheel in place upon the axle. The brackets 15 are placed on the axle in such manner that the sockets 17 will project rearwardly and at an angle to the vertical of about forty-five degrees.

To apply my improved guard to the bicycle, it is merely necessary to slip the ends of the bars 6 of the stay 1 endwise into the sockets 17 of the brackets 15, and secure the free end of the web 2 to the frame of the machine. The tension of the web will hold the stay rigid, the studs 11 of the bars engaging the recesses 10 and preventing the stay from unfolding or yielding in a forward direction, while the like connection between the arms 12 and 13 will hold the two members of the stay rigidly apart. The stay will thus serve to hold the web taut in position over the wheel. By attaching the brackets to the rear axle I avoid marring the machine, as is done by those devices wherein the guard-supports are clamped to the forks, and by providing the brackets with sockets, as shown, the stay may be instantly secured in place by merely inserting its ends therein, avoiding the necessity of manipulating any fastening devices, both members of the stay being instantly slipped into place by a single endwise movement.

When the guard is not needed, it may be very quickly detached by merely detaching the web, and then by folding up the stay in the manner described and rolling the web about the same in the manner shown in Fig. 2 the whole device is reduced to a very small and compact compass and may be stored away in the pocket or in the tool-bag of the machine.

Having described my invention, what I claim is—

1. A mud-guard stay for bicycles, consisting of a U-shaped frame the side members of which are made in sections pivotally secured together and folding in one direction only, a folding cross-brace connecting said side members together at one end, whereby said frame may be folded both laterally and longitudinally, and means for detachably connecting said frame to the rear axle of a bicycle, substantially as described.

2. A mud-guard stay for bicycles, consisting of a U-shaped frame the side members of which are made in sections pivotally secured together and folding in one direction only, the outer ends of each of the upper sections being provided with rigid inwardly projecting arms pivotally secured together by a hinge joint that permits said arms to fold but in one direction, and means for detachably securing said frame to the rear axle of a bicycle, substantially as described.

3. A mud-guard stay for bicycles, consisting of a U-shaped frame the side members of which are made in sections pivotally secured together and folding in one direction only, each section being pivotally secured to the inner side of the section next above it, the outer ends of each of the upper sections being provided with rigid inwardly projecting arms pivotally secured together by a hinge joint that permits said arms to fold but in one direction, the said arms being of unequal length, and means for detachably securing said frame to the rear axle of a bicycle, substantially as described and for the purpose specified.

4. A mud-guard stay for bicycles, consisting of a U-shaped frame the side members of which are formed in sections pivotally secured together by pivot pins, the outer ends of the upper sections being provided with rigid inwardly projecting arms pivotally secured together by pivot pins, the said bars and arms being provided with a projecting stud engaging a corresponding notch or recess in the adjacent bar or arm, and means for detachably securing said frame to the rear axle of a bicycle, substantially as described.

In testimony whereof I have hereunto set my hand and affixed my seal in presence of two subscribing witnesses.

JAMES W. SHONE. [L. S.]

Witnesses:
EPHRAIM H. HALL,
ERASTUS DANOW.